T. BICKFORD.
CLUTCH.
APPLICATION FILED DEC. 31, 1912.
1,163,803.
Patented Dec. 14, 1915.
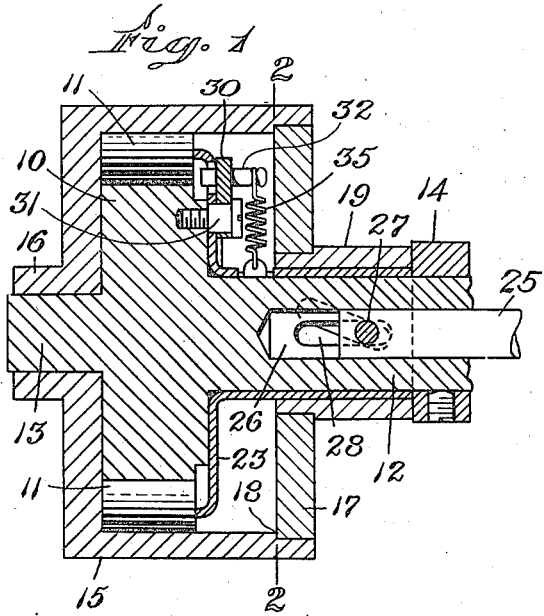
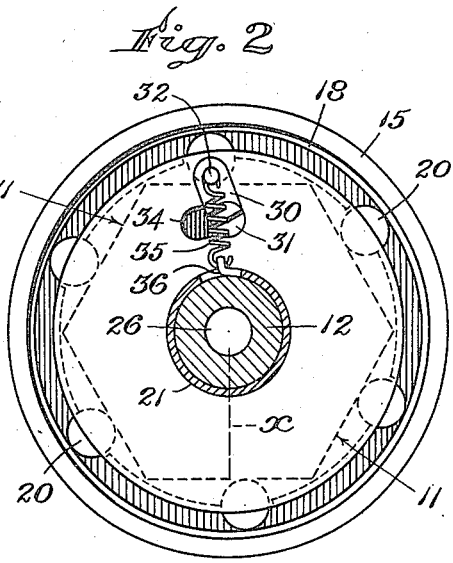
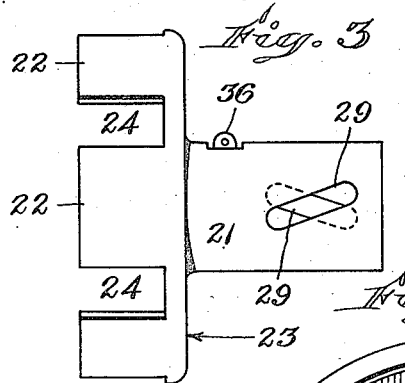
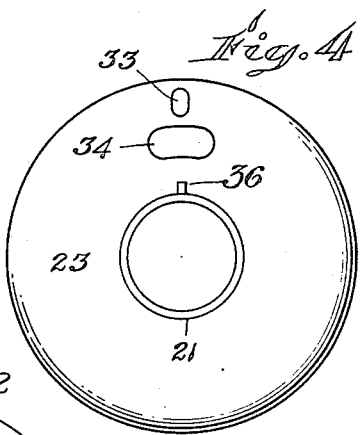
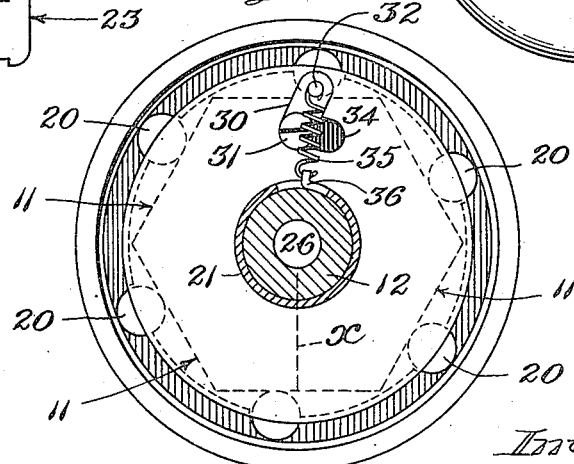
Witnesses:
P. W. Pezzetti
G. L. Johnson
Inventor
Thomas Bickford
by Brown Dundy May
Attorneys

UNITED STATES PATENT OFFICE.

THOMAS BICKFORD, OF BREWSTER, MASSACHUSETTS.

CLUTCH.

1,163,803.  Specification of Letters Patent.  Patented Dec. 14, 1915.

Application filed December 31, 1912. Serial No. 739,481.

*To all whom it may concern:*

Be it known that I, THOMAS BICKFORD, a citizen of the United States, and resident of Brewster, in the county of Barnstable and State of Massachusetts, have invented certain new and useful Improvements in Clutches, of which the following is a specification.

This invention relates to clutches, and is embodied in clutch mechanism whereby rotative movement in first one direction and then in the opposite direction of the driving element may be caused to impart intermittent step-by-step rotative movement wholly in one direction or wholly in the opposite direction of the driven element. Rotative movement is transmitted from the driving element to the driven element by an intermediate element which is capable of occupying any one of three different positions relatively to the driving element. These three positions include two driving positions and an intermediate position, the intermediate element in one of its driving positions being adapted to transmit rotative movement in one direction only, and when in the other driving position to transmit rotative movement in the opposite direction only, and when in the intermediate position to transmit no rotative movement at all, thereby enabling the driving element to continue moving in either direction without effecting movement of the driven element.

The invention also embodies manually operative means for shifting the intermediate element from one position to another, and means for holding it in either of its driving positions.

Of the accompanying drawings which illustrate one form in which the invention may be embodied: Figure 1 represents a longitudinal section of a clutch. Fig. 2 represents a cross section in the plane indicated by line 2—2 of Fig. 1, the outer casing being shown in elevation rather than in cross section. Fig. 3 represents a side elevation of a cage for positioning a plurality of rolling members which are parts of the intermediate element. Fig. 4 represents an end elevation of the cage shown by Fig. 3. Fig. 5 represents a section, similar to Fig. 2, showing the intermediate element in a different driving position.

The same reference characters indicate the same parts wherever they occur.

Before describing the structural details of the device, it may be stated that it is adapted to impart rotative movement to a rotary driven element from a rotary driving element, regardless of whether the driving element continues to rotate in one direction through a plurality of revolutions or whether its rotative movement is limited to oscillations less than 180 degrees. If the driving element moves first in one direction and then the other, the driven element can be caused to move only in one direction and to remain stationary while the driving element moves in the opposite direction, and the direction of movement which is imparted to the driven element can be changed at will. The intermittent step-by-step rotation of the driven element does not in any way depend upon the length or operation of movement of the driving element. In this embodiment of the invention, the driving element comprises a polygonal member 10 which is here shown as having six flat sides 11. The number of sides may be varied without departing from the principle of the invention. The polygonal member has trunnions 12 and 13 whereby it may be rotatively mounted. For the sake of description it may be assumed that the driving element rotates back and forth first in one direction and then the other, but it need not be assumed that these opposite movements are more or less than 360 degrees, because it is wholly immaterial whether the movements are more or less. The member indicated at 14 may be regarded as means whereby the member 10 is caused to rotate first in one direction and then in the opposite direction. If the device were to be used when the individual movements are more than 180 degrees, the member 14 would probably be a toothed or friction gear, but if these movements were less than 180 degrees, the member 14 might be a crank arm or might still be a gear of one form or another.

The driven element indicated at 15 is here shown in the form of a cylindric drum or casing, the outer cylindric surface being adapted to drive a belt (not shown) or to engage any other element to which it is desired to impart intermittent step-by-step movement. The casing 15 is shown as having a hub 16 which affords a bearing for the trunnion 13 of the driving element. The hub 16 is itself adapted to be mounted in a suitable bearing in which it may rotate, such bearing being omitted. One end of the casing 15 is provided with a removable plate or cover 17, which, when removed, permits the insertion and removal of the driving element and other members hereinafter described. The casing is shown as being provided with an annular shoulder 18, as a seat for the cover plate. The plate 17 has a hub 19 which, like the hub 16, is adapted to be mounted in a suitable bearing (not shown) and which is adapted to afford a bearing for the trunnion 12.

The intermediate element whereby rotative movement is transmitted from the driving element to the driven element comprises a plurality of rolling members 20 and a holder or spacer for preserving the desired relation between the rolling members and the polygonal member 10. This holder or spacer is shown separately by Figs. 3 and 4. It comprises a hub or sleeve 21, segmental spacing portions 22, and a flat annular portion 23 connecting the segmental portions 22 with the hub. This holder is shown in a form which could conveniently be produced by stamping and other die-press operations upon a blank of ductile sheet metal, and it may be understood that the holder is thus formed of ductile sheet metal. The number of segmental portions 22 is equal to the number of rolling members 20, the spaces 24 between the portions 22 being provided for the reception of the rolling members which are assembled as shown by Figs. 2 and 5. When the rolling members are in these spaces there is only sufficient clearance to enable them to turn freely. In this embodiment of the invention the rolling members are shown in the form of cylinders, but the invention is not limited to this form. Any other form of rolling members would be adapted to operate in like manner, but cylinders are preferred because they have greater strength and wearing property.

Each rolling member bears upon one of the faces 11 of the driving element and upon the internal cylindric surface of the driven element. When the parts are in the position shown by Fig. 2, the rolling members are adapted to transmit rotative movement to the driven element only when the driving element moves in a clockwise direction, the reason for which will be understood by all those who are familiar with the well known roller clutch. When the parts are in the relation shown by Fig. 5, the rolling members will transmit rotative movement to the driven element only when the driving element moves in a counter-clockwise direction. In the first instance the holder for the rolling members is turned in a counter-clockwise direction with reference to the driving element, while in the latter instance it is turned in a clockwise direction with relation to the driving element. These two views show the intermediate element in its two driving positions.

The device includes means for shifting the intermediate element to its various positions. This means includes a manually operative rod 25 which extends into a central chamber 26 formed in the driving element. This rod carries a pin 27 which extends transversely and projects at opposite sides through slots, such as that indicated at 28, formed in the driving element. The pin 27 also projects through slots 29 formed in the hub or sleeve 21 of the intermediate element. The slots 29 are at an angle relatively to the slots 28, and consequently when the rod 25 is moved longitudinally it will effect a slight rotative movement between the driving element and the intermediate element. This relative rotative movement is for the purpose of shifting each rolling member 20 to one side or the other of a point midway between the ends of the surface 11 on which the rolling member bears. For example, in Figs. 2 and 5 the dotted line $x$ extends radially from the axis of rotation to the middle of the lowest surface 11. In Fig. 2 the bottom rolling member is at the right of this center line, while in Fig. 5 it is at the left, and all the other rolling members are correspondingly related to their respective faces 11.

In addition to the means just described for shifting the intermediate element from one driving position to another, the device includes a yielding means for retaining the intermediate element in either of its driving positions. For this purpose a link 30 is mounted upon a pivot stud 31 which is affixed to the driving element, the link being free to swing around the stud. At the free end of the link there is a pin 32 which projects from the opposite sides of the link. One end of the pin 32 occupies a radial slot 33 formed in the flat annular portion 23 of the roll holder. The stud 31 extends through a slot 34 in the annular portion 23, this slot being segmental and concentric with relation to the axis of rotation. The end of the pin 32 which projects away from the roll holder is engaged with one end of a helical spring 35, the other end of the spring being connected to the sleeve 21. The connecting means for this purpose is here shown in the form of a tongue 36, struck out and bent up from the sleeve.

The effect of the spring will now be described. Referring first to Fig. 2, it may be seen that the spring is arranged to exert force upon the pin 32 in a counter-clockwise direction, because this pin is at the left of a line which would intersect the pivot stud 31 and anchorage 36 of the spring. This counter-clockwise tendency of the pin 32 causes a similar tendency of the spacing segments 22, because the pin 32 acts upon the roll holder while the pivot stud 31 is affixed to the driving element. The length of the slots 33 and 34 is sufficient to permit wedging the rolling members between the converging surfaces of the driving and driven elements. Now, if the roll holder be shifted relatively to the driving element to the other driving position shown by Fig. 5, the pin 32 will move from left to right about the pivot stud 31, and when it has moved beyond the median or neutral position the spring will carry it the rest of the way to the new driving position. The anchorage member 36 will also move in the same direction, thus amplifying the lateral movement of the spring across the axis of the pin 32. The rotative tendency of the roll holder relatively to the driving element is now reversed, and the rolling members are therefore wedged between the faces 11 and the internal surfaces of the driven member so that they will transmit rotative movement only when the driving member turns in a counterclockwise direction.

If the manually operative reversing member 25 be held midway between its extremities of movement, it will maintain the roll holder in a position intermediate of the two driving positions hereinbefore described, thus holding the several rolling members midway between the ends of their respective faces 11 where they will not be wedged at all. So long as the rolling members are held midway between the ends of the faces 11, the driving element may rotate or oscillate indefinitely without causing any movement of the driven element. The reversing rod 25 will, of course, partake of whatever rotative movement the driving element has, and this rotative movement will be transmitted to the intermediate element by the pin 27 so long as the pin is in the intermediate position, and thus the intermediate element will remain in the intermediate position with reference to the driving element so long as the reversing member 25 does not move longitudinally with reference to the driving element.

Having thus explained the nature of my said invention and described a way of constructing and using the same, although without attempting to set forth all the forms in which it may be made or all the modes of its use, what I claim is:

1. A rotatable driving member, a rotatable driven member, and an intermediate element adapted to transmit rotative movement from the driving member to the driven member, said driving and driven members having coöperative surfaces and said intermediate element comprising means for engaging said surfaces, said intermediate element being shiftable from one position to another relatively to the driving member and to transmit rotative movement in one direction only when in one of said positions and to transmit rotative movement in the opposite direction only when in the other of said positions, means arranged to shift said intermediate element from one of said driving positions to the other, and vice versa, and a spring arranged to hold said intermediate element in either of said transmitting positions.

2. A rotatable driving member and a rotatable driven member arranged coaxially, clutch mechanism arranged to transmit motion from said driving member to said driven member, one of said members having an axial socket, a rod arranged to move axially in said socket, said socket member having a slot communicating with said socket, said clutch mechanism having a slot arranged to coöperate with the first said slot, one of said slots being at an angle relatively to the other, and a member carried by said rod and arranged to coact with both of said slots to adjust said clutch mechanism in consequence of longitudinal movement of said rod.

3. A rotatable driving member, a rotatable driven member, adjustable means arranged to transmit rotative movement from said driving member to said driven member, said means being adjustable to one position to transmit rotative movement in one direction only, and to another position to transmit rotative movement in the opposite direction only, means arranged to adjust said transmitting means from either of said transmitting positions to a neutral position, and a spring arranged to adjust said transmitting means from said neutral position to either of said transmitting positions.

In testimony whereof I have affixed my signature, in presence of two witnesses.

THOMAS BICKFORD.

Witnesses:
PETER W. PEZZETTI,
JOHN E. POVEY.